US010735410B2

(12) United States Patent
Vendrow

(10) Patent No.: US 10,735,410 B2
(45) Date of Patent: Aug. 4, 2020

(54) SYSTEMS AND METHODS FOR AUTHENTICATING A USER FOR ACCESS TO A CONFERENCE SESSION BY VALIDATING THE USER'S LOCATION

(71) Applicant: RingCentral, Inc., Belmont, CA (US)

(72) Inventor: Vlad Vendrow, Reno, NV (US)

(73) Assignee: RINGCENTRAL, INC., Belmont, CA (US)

(*) Notice: Subject to any disclaimer, the term of this patent is extended or adjusted under 35 U.S.C. 154(b) by 36 days.

(21) Appl. No.: 16/036,135

(22) Filed: Jul. 16, 2018

(65) Prior Publication Data
US 2019/0207930 A1 Jul. 4, 2019

Related U.S. Application Data

(62) Division of application No. 15/857,907, filed on Dec. 29, 2017, now Pat. No. 10,057,257.

(51) Int. Cl.
H04L 29/06 (2006.01)
H04L 9/32 (2006.01)
(Continued)

(52) U.S. Cl.
CPC .......... H04L 63/0853 (2013.01); G06F 21/31 (2013.01); G06F 21/44 (2013.01); H04L 9/3271 (2013.01); H04L 63/08 (2013.01); H04L 65/1066 (2013.01); H04L 65/1069 (2013.01); H04L 65/1093 (2013.01);
(Continued)

(58) Field of Classification Search
CPC .......... G06F 21/31; G06F 21/32; G06F 21/34; G06F 21/36; G06F 21/44–445; G06F 2221/2111; H04L 9/3271; H04L 63/08; H04L 63/0853; H04L 63/0861; H04L 63/10; H04L 63/107; H04L 65/1066–1079; H04L 65/1093; H04L 65/403–4053; H04L 67/18;
(Continued)

(56) References Cited

U.S. PATENT DOCUMENTS 8,548,818 B2 10/2013 Wagner et al.
9,053,456 B2 * 6/2015 Verthein ................ G06Q 10/10
(Continued)

Primary Examiner — Kevin Bechtel
(74) Attorney, Agent, or Firm — Finnegan, Henderson, Farabow, Garrett & Dunner LLP

(57) ABSTRACT

Systems and methods are provided for authenticating a user for access to a conference session by validating the user's location. The systems and methods may include receiving an image captured with an image-capturing device. The image may be of an object visible to a user from an authorized conference-session location. The image may be associated with the authorized conference-session location. The systems and methods may further include receiving location information indicating the authorized conference-session location, generating challenge questions based on the image, and designating one or more challenge questions for display to the user. The systems and methods may further include receiving a response to the designated challenge questions, validating the user's location based on the response, authenticating the user for access to a conference session based on the response, and granting the user access to the conference session based on the authentication.

20 Claims, 6 Drawing Sheets

(51) Int. Cl.
*G06F 21/44* (2013.01)
*H04L 29/08* (2006.01)
*G06F 21/31* (2013.01)

(52) U.S. Cl.
CPC ............ *H04L 65/403* (2013.01); *H04L 67/18* (2013.01); *G06F 2221/2111* (2013.01)

(58) Field of Classification Search
CPC . H04W 4/021–022; H04W 4/029–046; H04W 12/06; H04W 12/08; H04W 64/00–006
See application file for complete search history.

(56) References Cited

U.S. PATENT DOCUMENTS

| | | |
|---|---|---|
| 9,288,196 B2 | 3/2016 | Shuster |
| 9,426,151 B2 | 8/2016 | Richards et al. |
| 9,485,253 B2 | 11/2016 | Carlson et al. |
| 9,589,127 B2 | 3/2017 | Copsey |
| 9,591,035 B2 | 3/2017 | Kuo et al. |
| 9,667,611 B1 | 5/2017 | Friedman et al. |
| 2013/0127591 A1 | 5/2013 | Shay et al. |
| 2013/0305337 A1 | 11/2013 | Newman et al. |
| 2014/0082713 A1 | 3/2014 | Markel et al. |
| 2016/0253710 A1 | 9/2016 | Publicover et al. |
| 2017/0006162 A1* | 1/2017 | Bargetzi ................. H04N 7/147 |
| 2017/0012971 A1* | 1/2017 | Endo ..................... H04W 4/026 |
| 2017/0053280 A1 | 2/2017 | Lishok et al. |
| 2017/0149758 A1 | 5/2017 | Uetabira |
| 2017/0177881 A1 | 6/2017 | Krishna et al. |
| 2017/0225336 A1 | 8/2017 | Deyle et al. |

\* cited by examiner

SYSTEMS AND METHODS FOR AUTHENTICATING A USER FOR ACCESS TO A CONFERENCE SESSION BY VALIDATING THE USER'S LOCATION

CROSS REFERENCE TO RELATED APPLICATIONS

This application is a divisional of and claims priority to U.S. patent application Ser. No. 15/857,907, filed Dec. 29, 2017, the entire contents of which are hereby incorporated by reference.

TECHNICAL FIELD

The present disclosure relates to the field of conference systems and, more specifically, to systems and methods for authenticating a user for a conference session by validating the user's location.

BACKGROUND

In a conference system, security measures may be employed to prevent unauthorized access to a conference session facilitated by conference system. Such security measures may comprise authentication mechanisms such as requiring users to provide user names and passwords, digital certificates, or other credentials. Network-security threats, however, are growing in sophistication and can potentially overcome these measures using, for example, phishing schemes. As a result, conference-system designers face technical challenges to developing security measures to prevent unauthorized access to their conference systems. Some of these technical challenges arise due to current conference systems having architectures unable to leverage currently deployed information-technology (IT) and security resources (e.g., hardware) when performing authentication tasks. Therefore, there is a need for a conference-system architecture and authentication mechanism capable of using existing IT and security resources to prevent unauthorized system use.

SUMMARY

Presently disclosed embodiments are directed to systems and methods for authenticating a user for access to a conference session by validating the user's location. In one embodiment, a system for authenticating a user for access to a conference session by validating the user's location may include at least one memory device storing computer-executable instructions and at least one processor configured to execute the stored instructions to receive at least one image captured with one or more image-capturing devices, wherein the at least one image may be of an object visible to a user from an authorized conference-session location and wherein the at least one image may be associated with the authorized conference-session location; receive location information indicating the authorized conference-session location; generate a plurality of challenge questions based on the at least one image; designate one or more challenge questions from the plurality of generated challenge questions for display to the user; receive at least one response to the one or more designated challenge questions; validate the user's location based on the at least one response; authenticate the user for access to a conference session based on the validation; and grant the user access to the conference session based on the authentication. In some embodiments, designating one or more challenge questions may comprise designating two or more challenge questions from the plurality of generated challenge questions for display to the user.

In some embodiments, the at least one image may be of the user and the at least one processor may be further configured to execute the stored instructions to identify the user based on the at least one image. In some embodiments, authenticating the user's location may comprise comparing information in the at least one response to information in the at least one image. In some embodiments, authenticating the user's location may comprise determining if the user is authorized to access the conference session from the user's location. In some embodiments, the at least one processor may be further configured to execute the stored instructions to receive a selection from the user. In some embodiments, the selection may be of at least one of the one or more challenge questions from the plurality of generated challenge questions. In some embodiments, at least one of the designated one or more challenge questions may have one or more question type and the selection may be of at least one question type.

In another embodiment, a non-transitory computer-readable medium may store instructions that may be executable by one or more processors to cause the processor to perform a method for authenticating a user for access to a conference session by validating the user's location. The method may comprise receiving at least one image captured with one or more image-capturing devices, wherein the at least one image may be of an object visible to a user from an authorized conference-session location and wherein the at least one image may be associated with the authorized conference-session location; receiving location information indicating the authorized conference-session location; generating a plurality of challenge questions based on the at least one image; designating one or more challenge questions from the plurality of generated challenge questions for display to the user; receiving at least one response to the one or more designated challenge questions; validating the user's location based on the at least one response; authenticating the user for access to a conference session based on the validation; and granting the user access to the conference session based on the authentication.

In some embodiments, designating one or more challenge questions may comprise designating two or more challenge questions from the plurality of generated challenge questions for display to the user. In some embodiments, the at least one image may be of the user and the method may further comprise identifying the user based on the at least one image. In some embodiments, authenticating the user's location may comprise comparing information in the at least one response to information in the at least one image. In some embodiments, authenticating the user's location may comprise determining if the user is authorized to access the conference session from the user's location. In some embodiments, the method may further comprise receiving a selection from the user. In some embodiments, the selection may be of at least one of the one or more challenge questions from the plurality of generated challenge questions. In some embodiments, at least one of the one or more designated challenge questions may be associated with one or more question type and the selection may be of at least one question type.

In another embodiment, a system for authenticating a user for access to a conference session by validating the user's location may comprise at least one memory device storing computer-executable instructions and at least one processor configured to execute the stored instructions to receive at least one image captured with at least one image-capturing device, wherein one or more of the at least one image may be of a user inside a conference room; identify the user from a list of one or more users; identify the conference room from a list of one or more conference rooms; authenticate the user for access to a conference session based on the identification of the user and the identification of the conference room; and grant the user access to the conference session in the conference room based on the authentication. In some embodiments, the at least one image is captured with a first image-capturing device and another at least one image is captured with a second image-capturing device and identifying the user may comprise comparing the one or more of the at least one image of the user inside the conference room with another of the at least one image. In some embodiments, the authentication may comprise determining if the user is authorized to access the conferencing session from the conference room.

In another embodiment, a non-transitory computer-readable medium may store instructions that are executable by one or more processors to cause the processor to perform a method for authenticating a user for access to a conference session by validating the user's location, the method comprising receiving at least one image captured with an image-capturing device, wherein one or more of the at least one image may be of a user inside a conference room; identifying the user from a list of one or more users; identifying the conference room from a list of one or more conference rooms; authenticating the user for access to a conference session based on the identification of the user and the identification of the conference room; and granting the user access to the conference session in the conference room based on the authentication.

Consistent with yet other disclosed embodiments, non-transitory computer-readable storage media can store program instructions, which are executed by at least one processor device and perform any of the methods described herein.

The foregoing general description and the following detailed description are explanatory only and are not restrictive of the claims.

BRIEF DESCRIPTION OF THE DRAWINGS

The accompanying drawings, which are incorporated in and constitute a part of this disclosure, illustrate several embodiments and, together with the description, serve to explain the disclosed principles. In the drawings.

DETAILED DESCRIPTION

Figure 1:
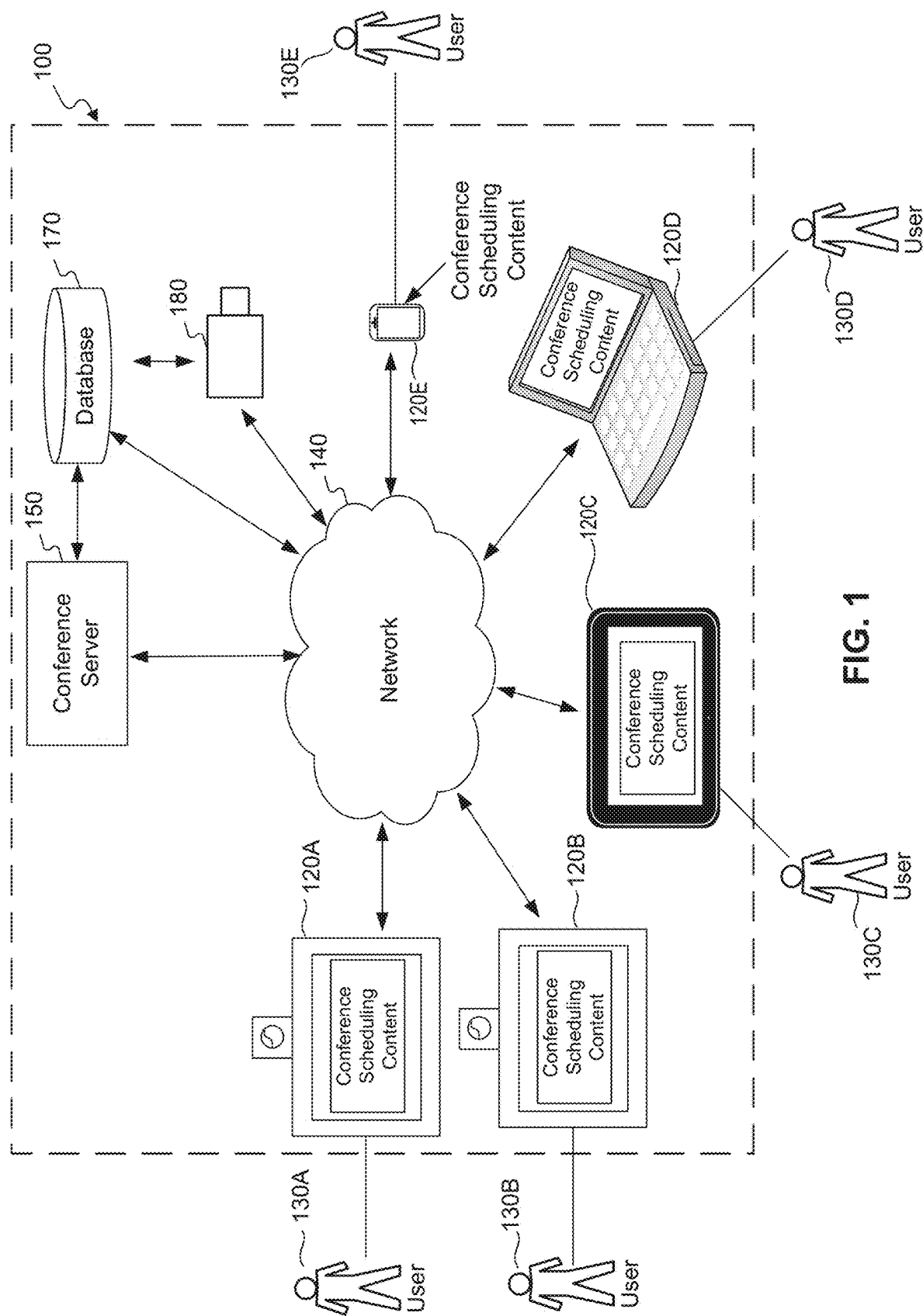
FIG. 1 is a diagram of an example of a conference system in which various implementations described herein may be practiced.

Reference will now be made in detail to the example embodiments implemented according to the present disclosure, the examples of which are illustrated in the accompanying drawings. Wherever possible, the same reference numbers will be used throughout the drawings to refer to the same or like parts.

Current conference systems have architectures and authentication mechanisms unable to leverage currently deployed information technology (IT) and security resources when performing authentication tasks against increasingly sophisticated threats. Therefore, there is a need for a conference system with an architecture and authentication mechanism capable of using already-deployed IT resources when performing authentication tasks.

In one embodiment, a conference system may restrict access to a conference session based on the location of a user attempting to access the session. For example, a conference session that is supposed to include a user in a particular conference room may authorize the user to access the conference session upon verifying that the user is, in fact, in the particular conference room. This authentication method may be used to prevent malicious access to the conference session from outside the conference room. Similarly, this authentication method may be used when trusted users have access to the conference room, ensuring that trusted users access the conference session. For example, if trusted employees have badges granting access to a conference room, the system may validate the conference room from which access to the conference session is requested to ensure that employees with appropriate badges are permitted access to the session. Validation of the conference room may be one of multiple steps in a user-authentication process or may be the only step in a user-authentication process. Verifying that the user is in a particular conference room may be accomplished by, for example, asking the user to answer questions based on visual observations of the conference room or by visually identifying the conference room and/or other users.

While the above description refers to accessing a conference session, it is to be understood that the systems and methods discussed herein may be used for accessing other services. These other services may include, for example, services where a user's location is relevant to the process of providing the service (e.g., a "location-based service"). Such services may include instant messaging services, chat services, or telephony services.

The embodiments described herein include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

Other features and advantages of the present embodiments are discussed in further detail below with respect to the figures.

FIG. 1 shows an example of a conference system 100 in which implementations as described herein may be practiced. Conference system 100 enables a plurality of users to set up conference sessions with one another via associated user devices or other conferencing devices. In some examples, one or more components of conference system 100, such as conference server 150, can be used to implement computer programs, applications, methods, processes, or other software to perform the described techniques and to realize the structures described herein.

As shown in FIG. 1, conference system 100 may include one or more user devices 120A-120E (collectively, "user devices 120"), a network 140, a conference server 150, a database 170, and an image-capturing device 180 (e.g., a camera, video camera, traffic camera, mobile phones with cameras, etc.). The components and arrangements shown in FIG. 1 are not intended to limit the disclosed embodiments, as the system components used to implement the disclosed processes and features can vary.

Network 140 facilitates communications and sharing of conference-scheduling content between user devices 120 and conference server 150. Network 140 may be any type of network that transmits communications, exchanges information, and/or facilitates the exchange of information between conference server 150 and user devices 120. For example, network 140 may be the Internet, a Local Area Network, a cellular network, a public switched telephone network ("PSTN"), or other suitable connection(s) that enables conference system 100 to send and receive information between components of conference system 100. Network 140 may support a variety of electronic messaging formats and may further support a variety of services and applications for user devices 120.

Conference server 150 can be a computer-based system including computer-system components, desktop computers, workstations, tablets, handheld computing devices, memory devices, and/or internal network(s) connecting the components. Conference server 150 may be configured to provide conference services, such as setting up conference sessions for users 130A-130E. Conference server 150 may be configured to receive information from user devices 120 over network 140, process the information, store the information, and/or transmit conference-session information to user devices 120 over network 140. For example, the conference server 150 may be configured to analyze images sent by users 130A-130E or image-capturing devices 180 and identify conference rooms and/or users based on the images. Conference server 150 may send conference invitations to user devices 120, where the conference invitation schedules a conference session at a conference room. In some implementations, the functionality of conference server 150 described in the present disclosure may be distributed among one or more of user devices 120A-120E. For example, one or more of user devices 120A-120E may perform function such as identifying conference rooms based on the images of objects and sending the conference invitations to other user devices.

Database 170 may include one or more physical or virtual storages coupled with conference server 150. Database 170 may be configured to store scheduled conference sessions, information about conference rooms (e.g., images of the conference rooms), and/or about the system users or employees of the company hosting conference system 100 (e.g., images of users). Database 170 may be adapted to store images of particular identifiers for the conference rooms, such as unique furniture, furniture arrangements, equipment, a view from the conference-rooms' windows, or a barcode. Database 170 may be adapted to store contact information of users 130 and/or images of users 130. Data stored in database 170 may be transmitted to conference server 150 to authenticate a user location for a conference session. In some embodiments, database 170 may be stored in a cloud-based server (not shown) that is accessible by conference server 150 and/or user devices 120 through network 140. While database 170 is illustrated as an external device connected to conference server 150, database 170 may also reside within conference server 150 as an internal component of conference server 150.

As shown in FIG. 1, users 130A-130E may communicate with conference server 150 using various types of user devices 120A-120E via network 140. As an example, user devices 120A, 120B, and 120D include a display such as a television, tablet, computer monitor, video conferencing console, or laptop computer screen. User devices 120A, 120B, and 120D may also include video/audio input devices such as a video camera, web camera, or the like. As another example, user devices 120C and 120E may include mobile devices such as a tablet or a smartphone having display and video/audio capture capabilities. User devices 120A-120E may also include one or more software applications that allow user devices 120A-120E to transmit communications to each other, such as through Instant Messages, text messages, EMAIL, VoIP, video conferences.

It should be noted that the term "user" is being used in the interest of brevity and may refer to any of a variety of entities that may be associated with a subscriber account such as, for example, a person, an organization, an organizational role within an organization, a group within an organization, etc. The user devices can include a variety of devices, such as mobile phones, landline phones, Voice over IP (VoIP) phones, gateways, audio and/or video conferencing devices, gaming consoles, personal computers, laptops, smartwatches, or tablets. The user devices may be installed with software that supports conferencing, such as web browsers, web-based real time communications (WebRTC) client application, a mobile application, or the like.

Figure 2:
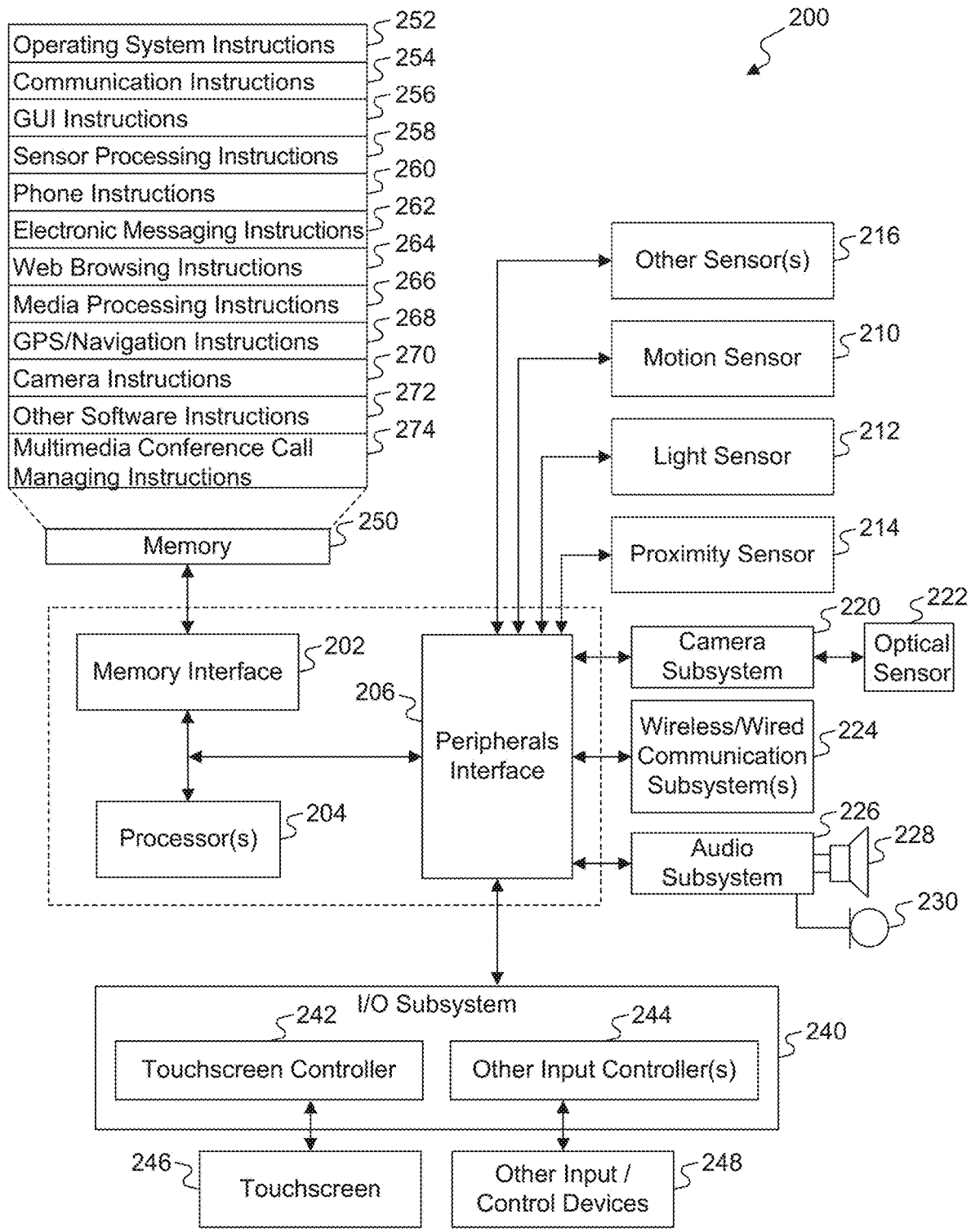
FIG. 2 is a diagram of an example user device for implementing embodiments consistent with the present disclosure.

FIG. 2 is a diagram of an example of a user device 200 that can be used in a conference system, such as conference system 100. User device 200 can be used to implement computer programs, applications, methods, processes, or other software to perform embodiments described in the present disclosure. User devices 120A-120E may be examples of such a user device. User device 200 may include a memory interface 202, one or more processors 204 such as data processors, image processors and/or central processing units, and a peripherals interface 206. Memory interface 202, one or more processors 204, and/or peripherals interface 206 can be separate components or can be integrated in one or more integrated circuits. The various components in user device 200 can be coupled by one or more communication buses or signal lines.

Sensors, devices, and subsystems can be coupled to peripherals interface 206 to facilitate multiple functionalities. For example, a motion sensor 210, a light sensor 212, and a proximity sensor 214 can be coupled to peripherals interface 206 to facilitate orientation, lighting, and proximity functions. Other sensors 216 can be connected to peripherals interface 206, such as a positioning system (e.g., GPS receiver), a temperature sensor, a biometric sensor, or other sensing device, to perform related functions. A GPS receiver can be integrated with, or connected to, user device 200. For example, the GPS receiver can be built into mobile telephones, such as smartphone devices. GPS software may allow mobile telephones to use an internal or external GPS receiver (e.g., connected via a serial port or Bluetooth). A camera subsystem 220 and an optical sensor 222, e.g., a charged coupled device ("CCD") or a complementary metal-oxide semiconductor ("CMOS") optical sensor, may be utilized to facilitate camera functions, such as recording photographs and video clips.

Communication functions may be facilitated through one or more wireless/wired communication subsystems 224, which include an Ethernet port, radio frequency receivers and transmitters, and/or optical (e.g., infrared) receivers and transmitters. The specific design and implementation of the wireless/wired communication subsystem 224 may depend on the communication network(s) over which the user device 200 is intended to operate. For example, in some embodiments, user device 200 may include wireless/wired communication subsystems 224 designed to operate over a GSM network, a GPRS network, an EDGE network, a Wi-Fi or WiMax network, and/or a Bluetooth® network.

An audio subsystem 226 may be coupled to a speaker 228 and a microphone 230 to facilitate voice-enabled functions, such as voice recognition, voice replication, digital recording, and/or telephony functions.

I/O subsystem 240 may include a touchscreen controller 242 and/or other input controller(s) 244. Touchscreen controller 242 may be coupled to a touchscreen 246. Touchscreen 246 and touchscreen controller 242 can, for example, detect contact and movement or cessation thereof using one or more touch-sensitivity technologies, including but not limited to capacitive, resistive, infrared, and/or surface acoustic wave technologies, as well as proximity sensor arrays or other elements for determining one or more points of contact with touchscreen 246. While touchscreen 246 is shown in FIG. 2, the I/O subsystem 240 may include a display screen (e.g., CRT or LCD) instead or in addition to touchscreen 246.

Other input controller(s) 244 is coupled to other input/control devices 248, such as one or more buttons, rocker switches, thumb-wheels, infrared ports, USB ports, and/or pointer devices, such as a stylus. Touchscreen 246 can, for example, be used to implement virtual or soft buttons and/or a keyboard.

Memory interface 202 may be coupled to memory 250. Memory 250 may include high-speed random access memory and/or non-volatile memory, such as one or more magnetic disk storage devices, one or more optical storage devices, and/or flash memory (e.g., NAND, NOR). Memory 250 may store operating system instructions 252, such as DRAWIN, RTXC, LINUX, iOS, UNIX, OS X, WINDOWS, or an embedded operating system such as VXWorkS. Operating system 252 can include instructions for handling basic system services and for performing hardware dependent tasks. In some implementations, operating system 252 can be a kernel (e.g., UNIX kernel).

Memory 250 may store communication instructions 254 to facilitate communicating with one or more additional devices, one or more computers, and/or one or more servers. Memory 250 can include graphical user interface (GUI) instructions 256 to facilitate graphical-user-interface processing; sensor-processing instructions 258 to facilitate sensor-related processing and functions; phone instructions 260 to facilitate phone-related processes and functions; electronic-messaging instructions 262 to facilitate processes and functions related to electronic messaging; web-browsing instructions 264 to facilitate processes and function related to web browsing; media-processing instructions 266 to facilitate processing and functions related to media processing; GPS/navigation instructions 268 to facilitate processes and functions related to GPS and navigation; camera instructions 270 to facilitate processing and functions related to camera subsystem 220; and/or other software instructions 272 to facilitate other processes and functions. Memory 250 may also include multimedia conference call managing instructions 274 to facilitate processes related to conference calls.

In some embodiments, communication instructions 254 may include one or more software applications to facilitate connection with conference server 150. Conference server 150 may schedule conference sessions among a plurality of users. Electronic messaging instructions 262 may include one or more software programs to generate conference-scheduling requests to conference server 150 for scheduling conference sessions. Electronic messaging instructions 262 may include software applications to receive conference invitations from conference server 150. Graphical-user-interface instructions 256 may include one or more software programs that facilitate display of the conference invitations to a user associated with a user device. Graphical-user-interface instructions 256 may instruct the user to provide user input or otherwise interact with the one or more software programs.

In some embodiments, instructions may cause processor 204 to perform one or more functions of the disclosed methods. For example, the instructions may cause camera subsystem 220 to capture a first image of an object and/or cause wireless communication subsystem(s) 224 to transmit the first image to conference server 150. In some embodiments, the instructions may cause processors 204 to identify a conference room based on the first image. For example, processors 204 may be configured to identify the conference room based on a physical layout of the conference room shown in the first image. As another example, processors 204 may be configured to identify the conference room by performing a comparison between the first image and pre-stored images in memory 250 or a second image captured by another device (e.g., user device 120E).

One or more of the above instructions and software applications may correspond to a set of instructions for performing one or more functions described above. These instructions need not be implemented as separate software programs, procedures, or modules. Memory 250 may include additional instructions. Various functions of user device 200 may be implemented in hardware and/or in software, including in one or more signal processing and/or application-specific integrated circuits.

Figure 3:
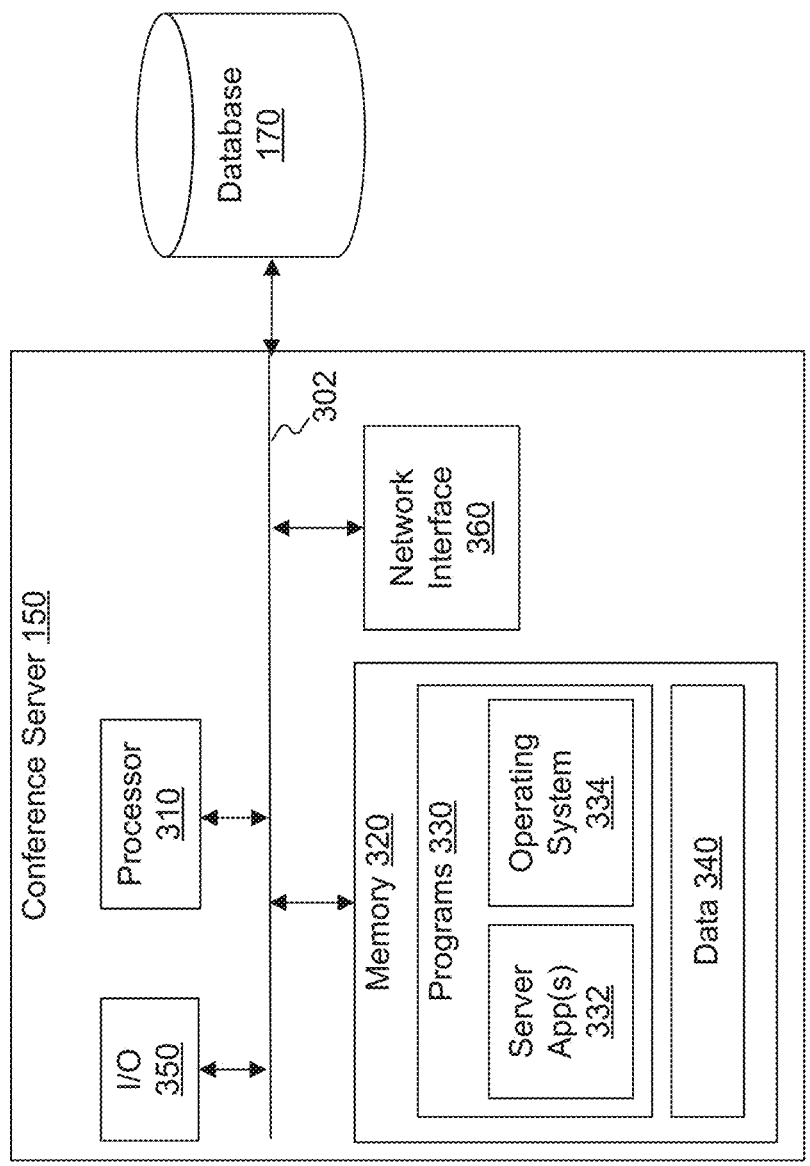
FIG. 3 is a diagram of an example conference server, consistent with the disclosed embodiments.

FIG. 3 shows a diagram of an example conference server 150, consistent with the disclosed embodiments. Conference server 150 may include a bus 302 (or other communication mechanism) which interconnects subsystems and components for transferring information within conference server 150. As shown, conference server 150 includes one or more processors 310, input/output ("I/O") devices 350, network interface 360 (e.g., a modem, Ethernet card, or any other interface configured to exchange data with a network), and one or more memories 320 storing programs 330 including, for example, server application(s) 332, operating system 334, and/or data 340, and can communicate with external database 170 (which, for some embodiments, may be included within conference server 150). Conference server 150 may be a single server or may be configured as a distributed computer system comprising multiple servers, server farms, clouds, and/or computers that interoperate to perform one or more of the processes and functionalities associated with the disclosed embodiments.

Processor 310 may be one or more processing devices configured to perform functions of the disclosed methods, such as a microprocessor manufactured by Intel™ or AMD™. Processor 310 may comprise a single core or a multi-core processor executing parallel processes simultaneously. Processor 310 may be a single-core processor configured with virtual-processing technologies. In certain embodiments, processor 310 may use logical processors to simultaneously execute and control multiple processes. Processor 310 may implement virtual-machine technologies or other technologies to execute, control, run, manipulate, store, etc. multiple software processes, applications, programs, etc. In some embodiments, processor 310 may include a multi-core processor arrangement (e.g., dual-core, quad-core, etc.) configured to provide parallel processing functionalities to allow conference server 150 to execute multiple processes simultaneously. It is to be appreciated that other types of processor arrangements could be implemented to provide the capabilities disclosed herein.

Memory 320 may be a volatile or non-volatile, magnetic, semiconductor, tape, optical, removable, non-removable, or other type of storage device or tangible or non-transitory computer-readable medium that stores one or more program (s) 330 such as server application(s) 332, operating system 334, and/or data 340. The non-transitory media may comprise, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and/or networked versions of the same.

Conference server 150 may include one or more storage devices configured to store information used by processor 310 (or other components) to perform certain functions related to the disclosed embodiments. For example, conference server 150 may include memory 320 that stores instructions to enable processor 310 to execute one or more applications, such as server application(s) 332, operating system 334, and/or any other type of application or software known to be available on computer systems. Alternatively or additionally, the instructions, application programs, etc., may be stored in database 170 (which can also be internal or external to conference server 150) and/or other external storage communicatively coupled with conference server 150 (not shown), such as one or more database or memory accessible over network 140.

Database 170 or other external storage may be a volatile or non-volatile, magnetic, semiconductor, tape, optical, removable, non-removable, or other type of storage device or tangible or non-transitory computer-readable medium. Memory 320 and database 170 may include one or more memory devices that store data and instructions used to perform one or more features of the disclosed embodiments. Memory 320 and database 170 may include any combination of one or more databases controlled by memory controller devices (e.g., server(s), etc.) or software, such as document-management systems, Microsoft SQL databases, SharePoint databases, Oracle™ databases, Sybase™ databases, or other relational databases. Though shown as separated from conference server 150, database 170 may be implemented within conference server 150.

In some embodiments, conference server 150 may be communicatively connected to one or more remote memory devices (e.g., remote databases (not shown)) through network 140 or a different network. Remote memory devices can be configured to store information that conference server 150 can access and/or manage. By way of example, the remote memory devices could be document-management systems, Microsoft SQL database, SharePoint databases, Oracle™ databases, Sybase™ databases, or other relational databases. Systems and methods consistent with disclosed embodiments, however, are not limited to separate databases or even to the use of a database.

Programs 330 may include one or more software modules configured to cause processor 310 to perform one or more functions of the disclosed embodiments. Moreover, processor 310 may execute one or more programs located remotely from one or more components of conference system 100. For example, conference server 150 may access one or more remote programs that, when executed, perform functions related to disclosed embodiments.

In some embodiments, server application(s) 332 may cause processor 310 to perform one or more functions of the disclosed methods. For example, the server application(s) 332 may cause processor 310 to authenticate a user location for a conference session. In some embodiments, other components of conference system 100 may be configured to perform one or more functions of the disclosed methods. For example, user devices 120A-120E may be configured to capture and analyze images of conference rooms to identify the conference rooms based on the image analysis.

In some embodiments, the program(s) 330 may include operating system 334, performing operating-system functions when executed by one or more processors such as processor 310. By way of example, the operating system 334 may include Microsoft Windows™, Unix™, Linux™, Apple™ operating systems, Personal Digital Assistant (PDA) or mobile operating systems such as Apple iOS, Google Android, Blackberry OS, or other types of operating systems. Conference server 150 may include software that, when executed by a processor, transmits communications through network 140 via network interface 360 and/or a direct connection to one or more user devices 120A-120E.

In some embodiments, data 340 may include, for example, scheduling information pertaining to conference sessions, images of conference rooms, images of users, contact information of users, and so on. For example, data 340 may include an album for one or more conference rooms, where the album may include a plurality of images of the conference room. In some embodiments the plurality of images may show various areas of the conference room or various views of the conference room.

Conference server 150 may include one or more I/O devices 350 having one or more interfaces for receiving signals or input from devices and providing signals or output to one or more devices that allow data to be received and/or transmitted by conference server 150. For example, conference server 150 may include interface components for interfacing with one or more input devices, such as one or more keyboards, mouse devices, and the like, to enable conference server 150 to receive input from a user or administrator (not shown).

Figure 4:
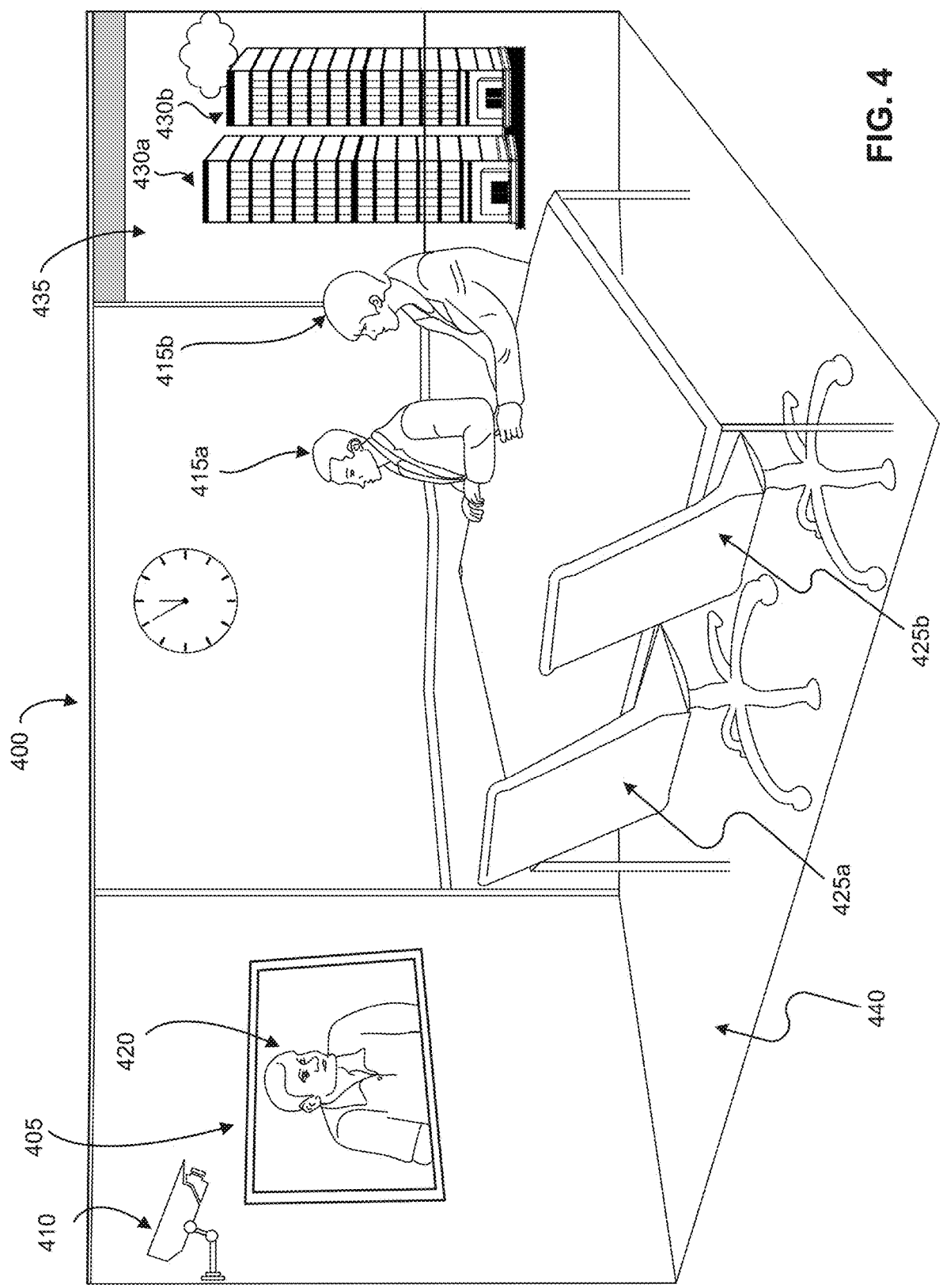
FIG. 4 is a diagram of an example conference room, consistent with the disclosed embodiments.

FIG. 4 shows a diagram of an example conference room 400, consistent with the disclosed embodiments. Conference room 400 may contain a conferencing device 405. Conferencing device 405 may be a user device 120, such as 120A. Conference room 400 may contain a video camera 410 or other image-capturing device 180. While illustrated as a separate device in FIG. 4 from conferencing device 405, video camera 410 may be a part of conferencing device 405 or a separate device. Users 415a and 415b may use conferencing device 405 in conference room 400 to participate in a conference session with a participant not present in conference room 400. A live video stream 420 of the participant not present in room 400 may be displayed on conferencing device 405.

In some embodiments, in order to access the conference session, users 415a or 415b may be required by conference system 100 to answer one or more question. These questions may pertain to an object observable from the conference room the users are authorized to use for the conference session. If the users are authorized to use conference room 400 for the conference session they are attempting to access, conference system 100 may ask questions pertaining to the identity of other people in conference room 400, objects in conference room 400, objects or people outside conference room 400, and/or conference room 400 itself. For example, conference system 100 may ask user 415a to identify who else is in conference room 400 (e.g., to provide the name of user 415b). Conference system 100 may ask one or more users to indicate the number of empty chairs in conference room 400 (e.g., to count chairs 425a and 425b). Conference system 100 may ask one or more users to indicate how many buildings are visible from a window of conference room 400 (e.g., count buildings 430a and 430b through window 435). Conference system 100 may ask one or more users to identify the flooring material in conference room 400 (e.g., whether floor 440 is hardwood, carpet, linoleum, etc.).

In some embodiments, conference system 100 may allow users to select which question they would like to answer from a set of multiple questions and/or to select the type of question they would like to answer. For example, conference system 100 may simultaneously present multiple questions to the users and let the users select which question they want to answer. Conference system 100 may present users with multiple question types, such as a type pertaining to the identity of people in conference room 400 and a type pertaining to objects in conference room 400. A user may select, for example, the question type pertaining to objects in conference room 400, and conference system 100 may ask the user to identify the number of empty chairs in conference room 400. In some embodiments, after a user selects a question type, conference system 100 may display a set of multiple questions of the selected type for the queried user to select which question from the set he/she wants to answer.

Conference system 100 may determine whether user 415a provided an accurate answer about conference room 400 by analyzing one or more images of conference room 400. For example, conference system 100 may ask user 415a to identify the number of empty chairs in conference room 400 from which user 415a is authorized to access the conference session. If user 415a responds at there are two empty chairs in conference room 400, conference system 100 may analyze an image of conference room 400 captured by video camera 410 to determine how many chairs are empty. Upon detecting two empty chairs, chairs 425a and 425b, conference system 100 may grant user 415a access to a conference session using conferencing device 405n some embodiments, conference system 100 may have access to predetermined correct answers to questions. These predetermined correct answers may be determined automatically by conference system 100 or may be manually provided by, for example, the conference-system administrator. If the one or more challenge question were answered correctly, access to the conference session may be granted. In some embodiments, another authentication step may be performed if one or more of the challenge questions were answered correctly. In some embodiments, another authentication step may be performed if one or more of the challenge questions were answered incorrectly.

The images of conference room 400 may be images captured by video camera 410 within a period of time leading up to conference system 100 querying user 415a, user 415a providing a response, and/or conference system 100 otherwise authenticating the user's location. In some embodiments, the images may be captured by other devices instead of or in addition to video camera 410, such as another image-capturing device 180.

In some embodiments, conference system 100 may detect the identity of user 415a in conference room 400 instead of or in addition to requesting that the user answer a question. For example, video camera 410 may capture at least one image of user 415a and send the at least one image to conference server 150. Conference server 150 may identify user 415a by comparing the captured image with previously captured images of users or employees of the company hosting conference system 100. These images may be stored in database 170. In some embodiments, conference system 100 may identify user 415a in conference room 400 in addition to requesting that user 415a answer questions.

Conference system 100 may determine from which conference room a user is attempting to enter into a conference session. In some embodiments, this may be done by identifying the conference room containing the conferencing device used by the user to request access to the conference session. For example, if user 415a attempts to enter a conference session using conferencing device 405, conference system 100 may determine which conference room contains conferencing device 405. For example, one or more components of conference system 100 may transmit an identifier of conferencing device 405 to conference server 150, which may retrieve conferencing device's 405 location from database 170. In some embodiments, conference server 150 may forward the retrieved location to one or more components of conference system 100. This method may be used, for example, if conferencing device 405 is unlikely to be moved often (e.g., a conferencing device with a very large and heavy display). In some embodiments, conference system 100 may detect the geographic location of conferencing device 405 using RFID tag asset tracking or other device-tracking means. One or more video camera 410 or other image-capturing devices 180 that are close or closest to the geographic location of conferencing device 405 may be used to capture at least one image of the location containing conferencing device 405. The at least one image may be transmitted to conference server 150 to identify the conference room by comparing the at least one image to previously captured images of multiple locations (e.g., multiple conference rooms). These previously captured images may be associated with data identifying a conference room or other location. The previously captured images of multiple locations may be stored, for example, in database 170. Conference server 150 may identify the conference room containing conferencing device 405 by checking the data associated with previously captured images that are similar to the at least one image transmitted to conference server 105. For example, the previously captured images of conference room 400 may show a furniture arrangement comprising a table in the center of conference room 400, four chairs, and a window on the back wall. If the image of the conference room that contains the conferencing device the user is using to access the conference session shows a similar furniture arrangement, conferencing server 150 may determine that the user is attempting to use a conferencing device in conference room 400 to access the conference session. Information identifying the conference room may be used to proceed with authentication.

In some embodiments, the process described above for identifying the location of conferencing device 405 may be used instead or additionally to identify the conference room containing user 415a.

Once information identifying the conference room containing conferencing device 405 and/or user 415a is received by conference server 150, conference system 100 may authenticate the user's location. This may comprise comparing the received information identifying the conference room to the conference room the user has authorization to access the conference session from. For example, conference system 100 may check whether user 415a is scheduled to participate in a conference session that designates the identified conference room as the one from which user 415a is attempting to access the conference session. Conference system 100 may perform this check by accessing conference-scheduling data in, for example, database 170. Conference-scheduling data may comprise data indicating from which conference room or other type of location user 415a may access a conference session. In some embodiments, the conference-scheduling data may comprise data indicating from which conference room or other type of location user 415 may not access a conference session.

Figure 5:
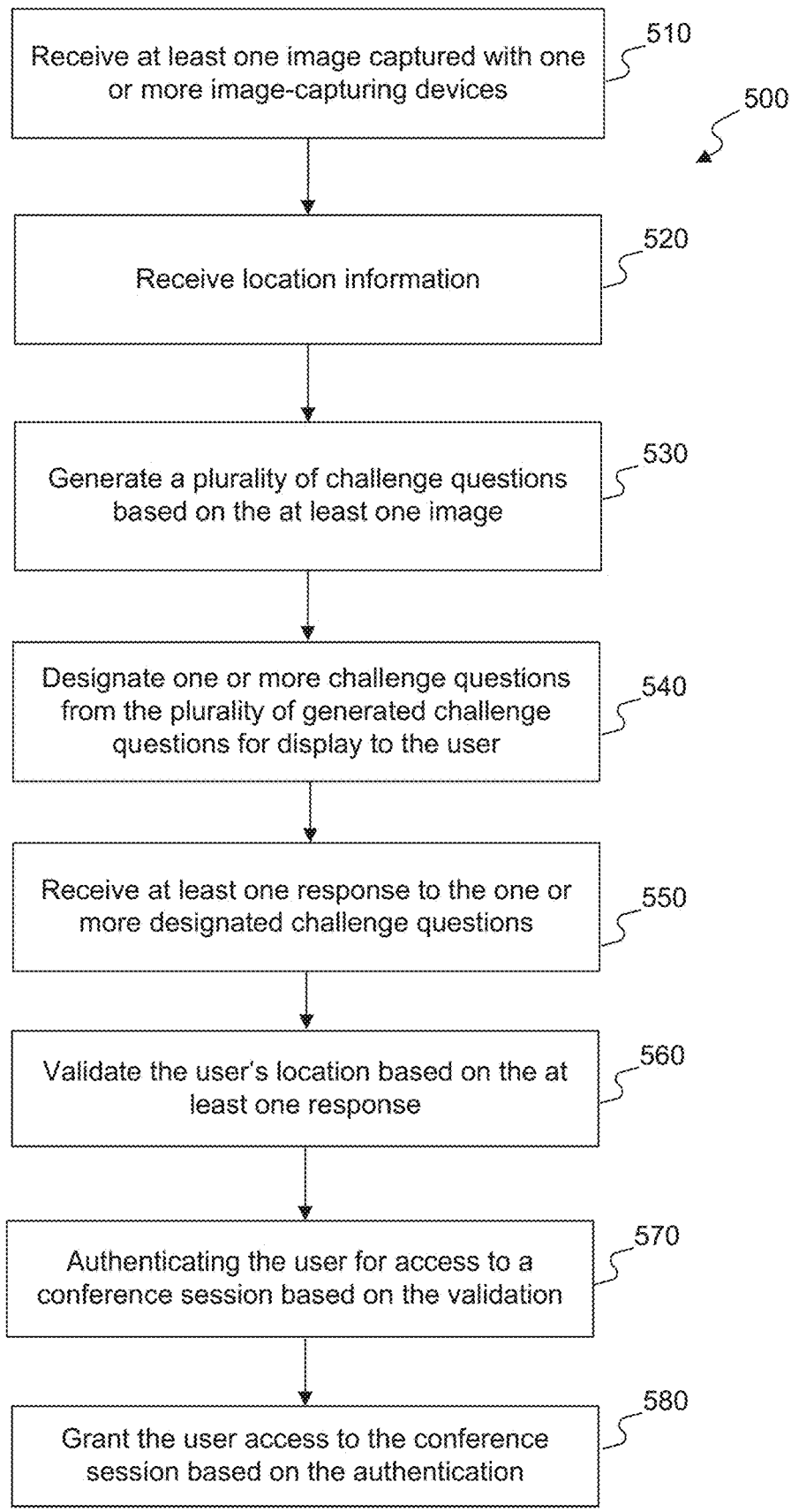
FIG. 5 is a flowchart of an example process for authenticating a user for access to a conference session by validating the user's location, in accordance with embodiments of the present disclosure.

FIG. 5 is a flowchart of an example process 500 for authenticating a user for access to a conference session by validating the user's location, in accordance with embodiments of the present disclosure. The steps associated with this example process may be performed by, for example, a processor of conference server 150 of FIG. 1. Different implementations may employ a different order of the example steps and/or include additional steps.

In step 510, conference server 150 of conference system 100 may receive at least one image captured with one or more image-capturing devices, such as image-capturing device 180. In some embodiments, the image-capturing device may be unrelated to conference system 100 (e.g., the user's personal camera). The image may be received by conference server 150 when the image is uploaded to the server or downloaded by the server from a memory storing the image, regardless of which image-capturing device captured the image. The images captured may be of one or more conference rooms and objects therein (e.g., a chair in a conference room) or another type of location and objects visible therefrom (e.g., a clock visible from a conferencing terminal). The images may be associated with one or more conference rooms. For example, an image of conference room 400 may be associated with conference room 400. In some embodiments, one or more of the captured images may be of a user attempting to join a conference session from a conference room or another location. The captured image of the user may be used to identify the user by comparing the captured image of the user to either previously captured images of the user or images of the user that have been generated by other means. For example, the previously captured image of the user may be associated with the user's name. The user may be identified using their name if image-recognition analysis determines that the captured image is similar to the previously captured images associated with the user's name.

In step 520, conference server 150 may receive location information. The location information may indicate locations wherefrom the user may join the conference session (e.g., authorized conference-session locations). For example, the location information may indicate that only a particular conference room may be used for the conference session the user is attempting to join. In some embodiments, the location information may be data retrieved from database 170, indicating which conference room the user may access a conference session from. This data may be retrieved based on input from the user indicating which conference session he/she wants to join.

In step 530, conference server 150 may generate a plurality of challenge questions based on the at least one image received in step 510. As discussed above with respect to FIG. 4, the challenge questions may be based on information contained in the at least one image of the conference room from which the user is authorized to join the conference session. For example, if the at least one image is of a conference room with chairs, one of the challenge questions may request that the user respond with the number of chairs in the conference room.

In step 540, one or more of the generated challenge questions may be designated for display to the user. In some embodiments, two or more challenge questions may be designated. Conference server 150 may determine which questions to designate for display to the user by determining which conference room or location the user is authorized to access the conference session from. For example, if the user is authorized to access the desired conference session from only conference room 400, conference server 150 may designate challenge questions pertaining to conference room 400, the objects therein, or objects visible from within conference room 400. In some embodiments, multiple questions may be designated for display to the user and the user may be permitted to select one or more of the questions to answer. For example, if the user is authorized to access the conference session from multiple conference rooms, conference server 150 may designate at least one challenge question pertaining to each of the authorized conference rooms. The user may then select the challenge question pertaining to the room he/she is in. In some embodiments, the challenge questions may be associated with a question type. For example, one or more questions may be associated with a question type that pertains to conference room 400. One or more other questions may be associated with a question type that pertains to another conference room. The user may select the type of question he/she wants to answer. In some embodiments, the user may select the type of question he/she wants to answer and select one or more questions associated with the selected type for responding to.

The user's responses to the one or more designated challenge questions may be received by conference server 150 in step 550. In step 560, conference server 150 may validate the user's location based on the user's response. For example, if the user answered the question correctly, conference system 100 may determine that the user is, in fact, in the conference room from which the user is authorized to access the conference session. Conference server 150 may determine whether the question was answered correctly by comparing the user's answers to the correct answers. Conference server 150 may determine the correct answer(s) by analyzing the at least one image received at step 510. In some embodiments, another user (e.g., an administrator of conference system 100) may designate the correct answers to each question.

In step 570, conference server 150 may authenticate the user for access to the conference session based on the validation. Authentication may be performed entirely based on the validation of the user's location or may be based on the validation and other authentication factors or steps.

In step 580, conference server 150 may grant the user access to the conference session based on successful authentication. In some embodiments, the foregoing method of authenticating a user location for a conference session may be one of multiple authentication steps. In this case, conference server 150 may proceed to other authentication steps upon successful authentication using the foregoing method or proceed to other authentication steps upon unsuccessful authentication using the foregoing method.

Figure 6:
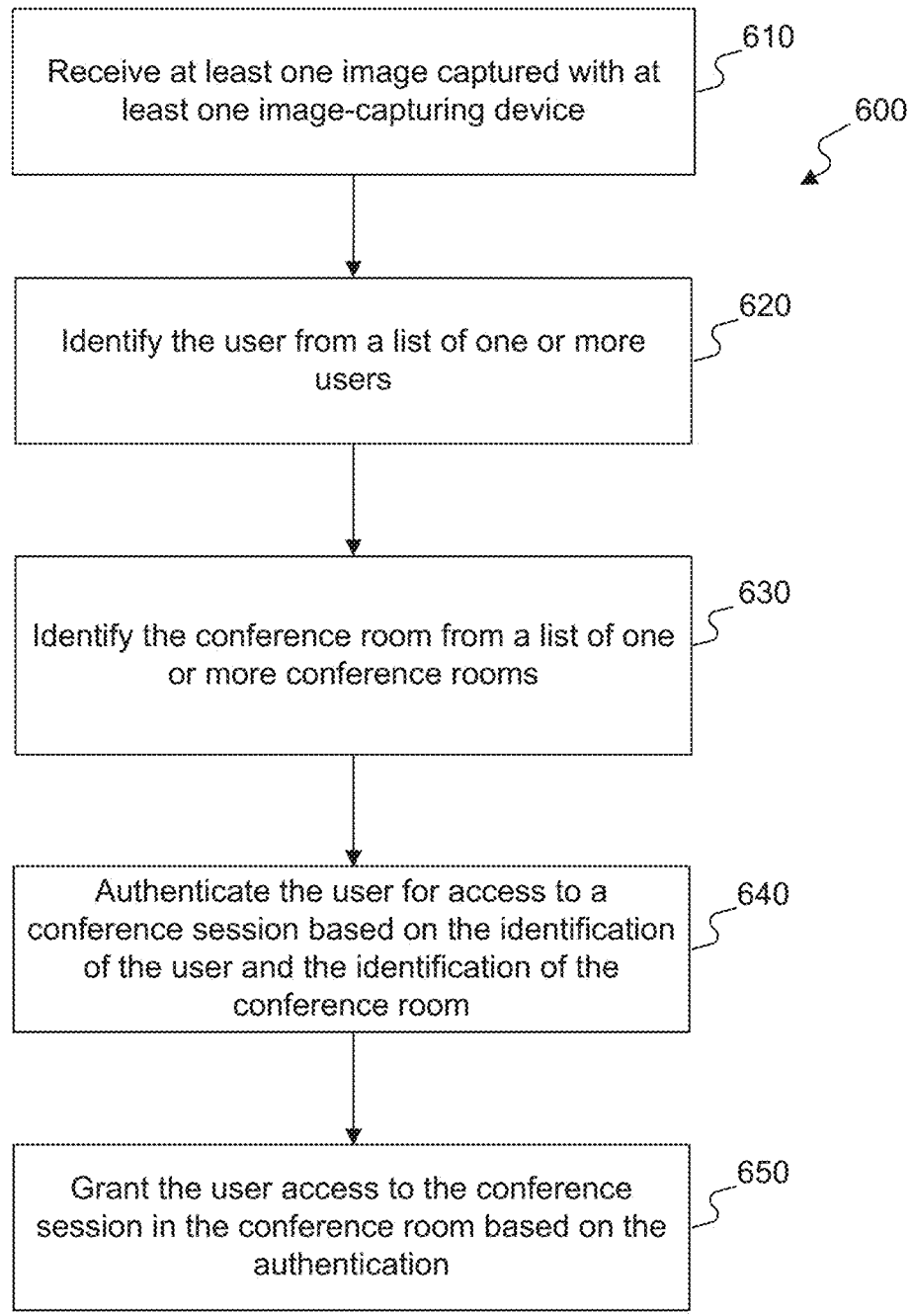
FIG. 6 is a flowchart of an example process for authenticating a user for access to a conference session by validating the user's location, in accordance with embodiments of the present disclosure.

FIG. 6 is a flowchart of an example process 600 for authenticating a user for access to a conference session by validating the user's location, in accordance with embodiments of the present disclosure. The steps associated with this example process may be performed by, for example, a processor of the conference server 150 of FIG. 1. Different implementations may employ a different order of the example steps and/or include additional steps.

In step 610, conference server 150 may receive at least one image captured with one or more image-capturing devices, such as image-capturing device 180. In some embodiments, the image-capturing device may be unrelated to conference system 100 (e.g., the user's personal camera). The image may be received by conference server 150 when the image is uploaded to the server or downloaded by the server from a memory storing the image, regardless of which image-capturing device captured the image. One or more of the captured images may be of a user attempting to join a conference session from a conference room or another location. At least one of the one or more of the captured images may be of the conference room or other location from which the user is attempting to join the conference session. At least one of the one or more of the captured images may be of both the user and the conference room or other location from which the user is attempting to join the conference session.

In step 620, the captured image of the user may be used to identify the user by comparing the captured image of the user to either previously captured images of the user or images of the user that have been generated by other means. For example, the previously captured image of the user may be associated with the user's name. The user may be identified using their name if image-recognition analysis determines that the captured image is similar to the previously captured images associated with the user's name. The image-recognition analysis may comprise identifying the user from a list of one or more other users by comparing the captured image to the previously captured images of the user and/or one or more other users.

In step 630, the captured image of the conference room may be used to identify the conference room by comparing the captured image of the conference room to either previously captured images of the conference room or images of the conference room that have been generated by other means. For example, the previously captured image of the conference room may be associated with the conference room name, number, or other designator. The conference room may be identified using its designator if image-recognition analysis determines that the captured image is similar to the previously captured images associated with the conference room's designator. The image-recognition analysis may comprise identifying the conference room from a list of one or more other conference rooms by comparing the captured image to the previously captured images of the conference room and/or one or more other conference rooms.

In step 640, the user authenticated based on the validation of the conference room. This authentication may be performed by accessing, for example, database 170 to retrieve information for the conference session the user is attempting to participate in. This conference-session information may designate which users may participate and/or may designate which conference rooms or other locations users may access the conference session from.

In step 650, the user may be granted access to the conference session in the conference room if the user is authenticated and the conference room validated successfully in step 640. In some embodiments, successful authentication of the user (without validating the conference room) or validation of the conference room (without authenticating the user) is sufficient for the user to be granted access to the conference session in the conference room. For example, some or all users may have credentials permitting them to access the conference session from any conference room or location. In another example, some or all conference rooms may be used to access the conference session by any user.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A system for authenticating a user for access to a conference session, the system comprising at least one memory device storing computer-executable instructions and at least one processor configured to execute the stored instructions to:
   receive an image captured with an image-capturing device, wherein the image includes depiction of a user inside a conference room;
   identify the user from a set of users;
   validate the conference room from a set of conference rooms based on comparing the image to previously captured images of the set of conference rooms; and authenticate the user for access to the conference session based on the identification of the user and the validation of the conference room.

2. The system of claim 1, wherein the image is a first image captured with a first image-capturing device and wherein identifying the user comprises comparing the first image with a second image captured with a second image-capturing device.

3. The system of claim 1, wherein the authentication comprises determining whether the conference room is a location where the user is authorized to access the conference session from.

4. The system of claim 1, wherein the authentication comprises receiving conference-session information designating a set of users authenticated to participate in the conference session.

5. The system of claim 1, wherein the authentication comprises receiving conference-session information designating a set of locations authenticated for a set of authenticated users to access the conference session.

6. The system of claim 1, wherein the authentication comprises receiving conference-session information designating a set of locations authenticated for the user to access the conference session.

7. The system of claim 1, wherein the image includes depiction of a furniture arrangement in the conference room and the authentication comprises comparing the image to a previously captured image of the conference room.

8. The system of claim 1, wherein the at least one processor is further configured to execute the stored instruction to receive detected geographic location data of a conferencing device in the conference room.

9. The system of claim 1, wherein the at least one processor is further configured to receive an identification of a conferencing device used to access the conference session.

10. The system of claim 1, wherein the at least one processor is further configured to grant the user access to the conference session based on the authentication.

11. A non-transitory computer-readable medium storing instructions that are executable by one or more processors to cause the processor to perform a method for authenticating a user for access to a conference session, the method comprising:
  receiving an image captured with an image-capturing device, wherein the image includes depiction of a user inside a conference room;
  identifying the user from a set of users;
  validating the conference room from a set of conference rooms based on comparing the image to previously captured images of the set of conference rooms; and
  authenticate the user for access to the conference session based on the identification of the user and the validation of the conference room.

12. The non-transitory computer-readable medium of claim 11, wherein the image is a first image captured with a first image-capturing device and wherein identifying the user comprises comparing the first image with a second image captured with a second image-capturing device.

13. The non-transitory computer-readable medium of claim 11, wherein authenticating the user comprises determining whether the conference room is a location where the user is authorized to access the conference session from.

14. The non-transitory computer-readable medium of claim 11, wherein authenticating the user comprises receiving conference-session information designating a set of users authenticated to participate in the conference session.

15. The non-transitory computer-readable medium of claim 11, wherein authenticating the user comprises receiving conference-session information designating a set of locations authenticated for a set of authenticated users to access the conference session.

16. The non-transitory computer-readable medium of claim 11, wherein authenticating the user comprises receiving conference-session information designating a set of locations authenticated for the user to access the conference session.

17. The non-transitory computer-readable medium of claim 11, wherein the image includes depiction of a furniture arrangement in the conference room and authenticating the user comprises comparing the image to a previously captured image of the conference room.

18. The non-transitory computer-readable medium of claim 11, wherein the method further comprises receiving detected geographic location data of a conferencing device in the conference room.

19. The non-transitory computer-readable medium of claim 11, wherein the method further comprises receiving an identification of a conferencing device used to access the conference session.

20. The non-transitory computer-readable medium of claim 11, wherein the method further comprises granting the user access to the conference session based on the authentication.

* * * * *